United States Patent [19]

Scrima et al.

[11] Patent Number: 5,196,465
[45] Date of Patent: Mar. 23, 1993

[54] POLYMERIC THERMOPLASTIC MATERIALS, COMPRISING 1,2,4-TRIAZOLIDINE-3,5-DIONE DERIVATIVES AS STABILIZERS

[75] Inventors: Roberto Scrima, Bologna; Graziano Zagnoni, Vergato-Bologna; Valerio Borzatta, Bologna, all of Italy

[73] Assignee: Ciba-Geigy Corporation, Ardsley, N.Y.

[21] Appl. No.: 830,013

[22] Filed: Feb. 3, 1992

[30] Foreign Application Priority Data

Feb. 5, 1991 [IT] Italy ................................ 285 A/91

[51] Int. Cl.⁵ .................. C08K 5/3492; C08K 3/3472
[52] U.S. Cl. .................................. 524/101; 524/105; 524/106
[58] Field of Search ........................ 524/101, 105, 106; 548/263.4, 263.6

[56] References Cited

U.S. PATENT DOCUMENTS

| | | | |
|---|---|---|---|
| 4,377,694 | 3/1983 | Giesecke et al. | 548/263.4 |
| 4,396,736 | 8/1983 | Dhein et al. | 524/105 |
| 4,419,520 | 12/1983 | Rottmaier et al. | 548/263.4 |
| 4,433,085 | 2/1984 | Rottmaier et al. | 548/263.4 |
| 4,467,099 | 8/1984 | Giesecke et al. | 548/263.4 |
| 4,665,190 | 5/1987 | Merten et al. | 548/263.4 |

FOREIGN PATENT DOCUMENTS

| | | |
|---|---|---|
| 0390026 | 10/1990 | European Pat. Off. |
| 3112795 | 10/1982 | Fed. Rep. of Germany |
| 3200433 | 7/1983 | Fed. Rep. of Germany |
| 8707892 | 12/1987 | PCT Int'l Appl. |

OTHER PUBLICATIONS

Derwent Abstract 86018 E/41.
Chem. Abstract 98, 145160k (1983).
Derwent Abstract 83-717862/30.
Chemical Abstract, 99, 141080g.
Derwent Abstract 90-299007/40.
Chemical Abstract, 114, 103011f (1991).

*Primary Examiner*—Veronica P. Hoke
*Attorney, Agent, or Firm*—Luther A. R. Hall

[57] ABSTRACT

The present invention relates to polymeric thermoplastic materials stabilized against thermal degradation by means of using one or more compounds of the formula (I)

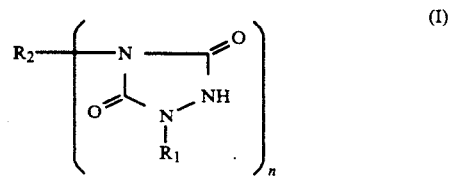

in which $R_1$ is e.g. $C_1$–$C_4$ alkyl or phenyl and n is e.g. 1 or 2 and, when n is 1, $R_2$ is e.g. $C_1$–$C_4$ alkyl, phenyl or cyclohexyl, and, when n is 2, $R_2$ is e.g. $C_2$–$C_6$ alkylene, methylenedicyclohexylene, a group

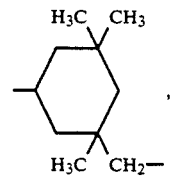

methylphenylene or methylenediphenylene.

9 Claims, No Drawings

POLYMERIC THERMOPLASTIC MATERIALS, COMPRISING 1,2,4-TRIAZOLIDINE-3,5-DIONE DERIVATIVES AS STABILIZERS

The present invention relates to thermoplastic materials stabilised against thermal degradation by means of using 1,2,4-triazolidine-3,5-dione derivatives.

Several hydroxybenzyl derivatives of 1,2,4-triazolidine-3,5-dione used for modifying melamine resins, urea resins and phenolic resins, have been reported in DE-A-3,112,795.

In DE-A-3,200,433, derivatives of hydroxyethyl-1,2,4-triazolidine-3,5-diones have been claimed as stabilisers for organic materials against thermooxidative and actinic degradation.

The use of some derivatives of 1,2,4-triazolidine-3,5-dione as initiators for free-radical polymerisation has been reported in EP-A-390,026.

The present invention relates to a composition stabilised against thermal degradation, comprising a polymeric thermoplastic material and one or more compounds of the formula (I)

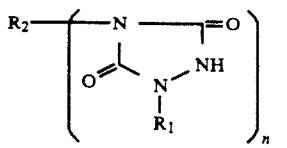 (I)

in which $R_1$ is $C_1-C_{18}$alkyl, $C_5-C_{12}$cycloalkyl which is unsubstituted or mono-, di- or tri-substituted by $C_1-C_4$alkyl; $C_3-C_{18}$alkenyl, phenyl which is unsubstituted or mono-, di-or tri-substituted by radicals selected from the group consisting of $C_1-C_4$alkyl, $C_1-C_4$alkoxy and OH; $C_7-C_9$phenylalkyl which is unsubstituted or mono-, di- or tri-substituted on the phenyl by radicals selected from the group consisting of $C_1-C_4$alkyl and OH; n is 1, 2 or 3 and, when n is 1, $R_2$ is as defined for $R_1$ or is a group

where $R_3$ and $R_4$ which are identical or different are as defined for $R_1$, or $R_3$ is also hydrogen or a group

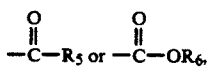

in which $R_5$ is hydrogen, $C_1-C_{18}$alkyl, $C_5-C_{12}$cycloalkyl which is unsubstituted or mono-, di-or tri-substituted by $C_1-C_4$alkyl; $C_2-C_{18}$alkenyl, phenyl which is unsubstituted or mono-, di- or tri-substituted by radicals selected from the group consisting of $C_1-C_4$alkyl, $C_1-C_4$alkoxy and OH; $C_7-C_9$phenylalkyl which is unsubstituted or mono-, di- or tri-substituted on the phenyl by radicals selected from the group consisting of $C_1-C_4$alkyl and OH; and $R_6$ is $C_1-C_{18}$alkyl, $C_5-C_{12}$cycloalkyl which is unsubstituted or mono-, di- or tri-substituted by $C_1-C_4$alkyl; $C_3-C_{18}$alkenyl or $C_7-C_9$phenylalkyl which is unsubstituted or mono-, di-or tri-substituted on the phenyl by $C_1-C_4$alkyl; and when n is 2, $R_2$ is $C_2-C_{12}$alkylene, 2-hydroxytrimethylene, $C_4-C_{12}$alkylene interrupted by 1, 2 or 3 oxygen atoms or by an $>N-R_7$ group, with $R_7$ being as defined for $R_6$ or being hydrogen; $C_5-C_7$cycloalkylene, $C_5-C_7$cycloalkylenedi-($C_1-C_4$alkylene), $C_1-C_4$alkylenedi-($C_5-C_7$cycloalkylene), $C_2-C_4$alkylidenedi-($C_5-C_7$cycloalkylene), a group

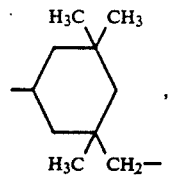

phenylene, phenylenedi-($C_1-C_4$alkylene), ($C_1-C_4$alkylene)-diphenylene, ($C_2-C_4$alkylidene)-diphenylene or oxydiphenylene, each phenylene group and cycloalkylene group is unsubstituted or mono- or di-substituted by $C_1-C_4$alkyl; or $R_2$ is a group of the formula (IIa) or (IIb)

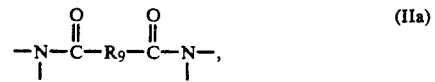 (IIa)

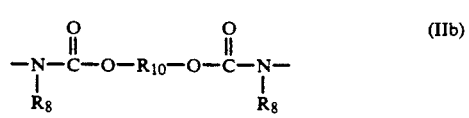 (IIb)

in which $R_8$ is as defined for $R_1$, $R_9$ is a direct bond, $C_1-C_{12}$alkylene, $C_2-C_{12}$alkylene interrupted by 1, 2 or 3 oxygen atoms or by an $>N-R_7$ group, with $R_7$ being as defined above; $C_2-C_{20}$alkylidene, phenyl-($C_1-C_{14}$alkylidene), phenylene which is unsubstituted or mono- or di-substituted by $C_1-C_4$alkyl; $C_2-C_{20}$alkenylene, $C_5-C_7$cycloalkylene, $C_5-C_7$cycloalkenylene, $C_7-C_9$bicycloalkylene or $C_7-C_9$bicycloalkenylene, each cycloalkylene group, cycloalkenylene group, bicycloalkylene group and bicycloalkenylene group is unsubstituted or mono- or di-substituted by $C_1-C_4$alkyl; $R_{10}$ is $C_2-C_{12}$alkylene, $C_4-C_{12}$alkylene interrupted by 1,2 or 3 oxygen atoms; $C_5-C_7$cycloalkylene, $C_5-C_7$cycloalkylenedi-($C_1-C_4$alkylene), $C_1-C_4$alkylenedi-($C_5-C_7$cycloalkylene), $C_2-C_4$alkylidenedi-($C_5-C_7$cycloalkylene), phenylene, phenylenedi-($C_1-C_4$alkylene), ($C_1-C_4$alkylene)-diphenylene or ($C_2-C_4$alkylidene)-diphenylene, each phenylene group and cycloalkylene group is unsubstituted or mono- or di-substituted by $C_1-C_4$alkyl; and, when n is 3, $R_2$ is a group of the formula (III)

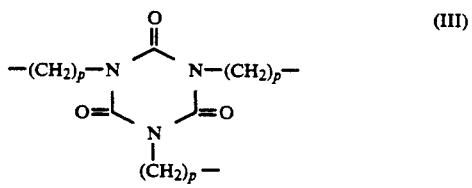 (III)

in which p is an integer from 2 to 6.

Examples of $C_1-C_{18}$alkyl are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, pentadecyl, hexadecyl, heptadecyl and octadecyl.

Representative examples of the various unsubstituted or substituted $C_5-C_{12}$cycloalkyl groups are cyclopentyl, methylcyclopentyl, dimethylcyclopentyl, cyclohexyl, methylcyclohexyl, dimethylcyclohexyl, trimethylcyclohexyl, t-butylcyclohexyl, cyclooctyl, cyclodecyl and cyclododecyl; cyclohexyl which is unsubstituted or substituted by $C_1$–$C_4$alkyl is preferred.

Examples of alkenyl having not more than 18 carbon atoms are vinyl, allyl, 1-propenyl, butenyl, 2-methylallyl, hexenyl, heptenyl, octenyl, decenyl, undecenyl, dodecenyl, tetradecenyl, hexadecenyl, heptadecenyl and octadecenyl.

Examples of substituted phenyl are methylphenyl, dimethylphenyl, trimethylphenyl, t-butylphenyl, methoxyphenyl, ethoxyphenyl, hydroxyphenyl and 3,5-di-t-butyl-4-hydroxyphenyl.

Representative examples of the various $C_7$–$C_9$phenylalkyl groups which are unsubstituted or substituted on the phenyl are benzyl, methylbenzyl, dimethylbenzyl, trimethylbenzyl, t-butylbenzyl, 2-phenylethyl and 2-(3,5-di-t-butyl-4-hydroxyphenyl)-ethyl.

Examples of alkylene having not more than 12 carbon atoms are methylene, ethylene, propylene, trimethylene, tetramethylene, pentamethylene, 2,2-dimethyltrimethylene, hexamethylene, heptamethylene, octamethylene, decamethylene and dodecamethylene.

Examples of alkylene having not more than 12 carbon atoms and being interrupted by 1,2 or 3 oxygen atoms, are 2-oxapropane-1,3-diyl, 3-oxapentane-1,5-diyl, 2,5-dioxahexane-1,6-diyl, 3,6-dioxaoctane-1,8-diyl, 4,7-dioxadecane-1,10-diyl, 4,9-dioxadodecane-1,12-diyl, 2,5,8-trioxanonane-1,9-diyl and 3,6,9-trioxaundecane-1,11-diyl.

Representative examples of alkylene having not more than 12 carbon atoms and being interrupted by $>$N—$R_7$ are the groups

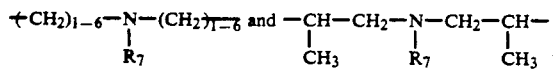

Representative examples of $C_2$–$C_{20}$alkylidene $R_9$ are ethylidene, propylidene, 1-methylethylidene, butylidene, pentylidene, 1-ethylpropylidene, heptylidene, 1-ethylpentylidene, nonylidene, tridecylidene, pentadecylidene, heptadecylidene and nonadecylidene.

Representative examples of phenyl($C_1$–$C_{14}$alkylidene) $R_9$ are benzylidene, 2-phenylethylidene, 1-phenyl-2-hexylidene, 1-phenyl-2-decylidene and 1-phenyl-2-tetradecylidene.

Representative examples of $C_2$–$C_{20}$alkenylene $R_9$ are vinylene, methylvinylene, octylvinylene, dodecylvinylene, tetradecylvinylene, hexadecylvinylene and octadecylvinylene.

Representative examples of groups containing 1 or 2 unsubstituted or substituted $C_5$–$C_7$cycloalkylene groups are cyclohexylene, methylcyclohexylene, cyclohexylenedimethylene, methylenedicyclohexylene and isopropylidenedicyclohexylene.

Representative examples of unsubstituted or substituted $C_5$–$C_7$cycloalkenylene $R_9$ are cyclohexenylene, methylcyclohexenylene and dimethylcyclohexenylene.

Representative examples of unsubstituted or substituted $C_7$–$C_9$bicycloalkylene or unsubstituted or substituted $C_7$–$C_9$bicycloalkenylene $R_9$ are the groups

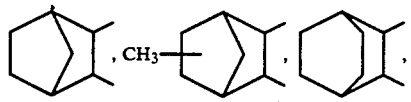

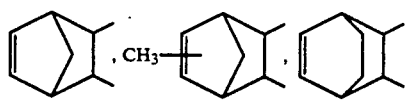

Representative examples of groups containing 1 or 2 unsubstituted or substituted phenylene groups are phenylene, methylphenylene, dimethylphenylene, xylylene, methylxylylene, methylenediphenylene, isopropylidenediphenylene and oxydiphenylene.

Those compounds of the formula (I) are preferred in which $R_1$ is $C_1$–$C_{16}$alkyl, $C_5$–$C_8$cycloalkyl which is unsubstituted or mono-, di- or tri-substituted by $C_1$–$C_4$alkyl; $C_3$–$C_{12}$alkenyl, phenyl which is unsubstituted or mono-, di- or tri-substituted by radicals selected from the group consisting of $C_1$–$C_4$alkyl, $C_1$–$C_4$alkoxy and OH; benzyl or phenylethyl which, both, are unsubstituted or mono-, di- or tri-substituted on the phenyl by radicals selected from the group consisting of $C_1$–$C_4$alkyl and OH; n is 1, 2 or 3 and, when n is 1, $R_2$ is as defined for $R_1$ or is a group

where $R_3$ and $R_4$ which are identical or different are as defined for $R_1$, or $R_3$ is also hydrogen or a group

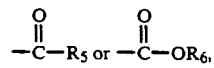

in which $R_5$ is hydrogen, $C_1$–$C_{16}$alkyl, $C_5$–$C_8$cycloalkyl which is unsubstituted or mono-, di- or tri-substituted by $C_1$–$C_4$alkyl; $C_2$–$C_{17}$alkenyl, phenyl which is unsubstituted or mono-, di- or tri-substituted by radicals selected from the group consisting of $C_1$–$C_4$alkyl, $C_1$–$C_4$alkoxy and OH; benzyl or phenylethyl which, both, are unsubstituted or mono-, di-or tri-substituted on the phenyl by radicals selected from the group consisting of $C_1$–$C_4$alkyl and OH; and $R_6$ is $C_1$–$C_{16}$alkyl, $C_5$–$C_8$cycloalkyl which is unsubstituted or mono-, di- or tri-substituted by $C_1$–$C_4$alkyl; $C_3$–$C_{12}$alkenyl or benzyl which is unsubstituted or mono-, di- or trisubstituted on the phenyl by $C_1$–$C_4$alkyl; and, when n is 2, $R_2$ is $C_2$–$C_{10}$alkylene, 2-hydroxytrimethylene, $C_4$–$C_{10}$alkylene interrupted by 1, 2 or 3 oxygen atoms or by an $>$N—$R_7$ group, with $R_7$ being as defined for $R_6$ or being hydrogen; cyclohexylene, cyclohexylenedimethylene, methylenedicyclohexylene, isopropylidenedicyclohexylene, a group

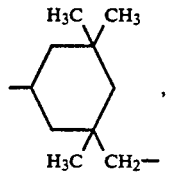

phenylene, methylphenylene, xylylene, methylenediphenylene, isopropylidenediphenylene or oxydiphenylene or $R_2$ is a group of the formula (IIa) or (IIb) in which $R_8$ is defined as for $R_1$, $R_9$ is a direct bond, $C_1-C_{10}$alkylene, $C_2-C_{10}$alkylene interrupted by 1, 2 or 3 oxygen atoms or by an >N—$R_7$ group with $R_7$ being as defined above; $C_2-C_{15}$alkylidene, phenyl-($C_1-C_{10}$alkylidene), $C_2-C_{16}$alkenylene, cyclohexylene, methylcyclohexylene, cyclohexenylene, bicycloheptylene, bicycloheptenylene or phenylene, and $R_{10}$ is $C_2-C_{10}$alkylene, $C_4-C_{10}$alkylene interrupted by 1, 2 or 3 oxygen atoms; cyclohexylene, cyclohexylenedimethylene, methylenedicyclohexylene, isopropylidenedicyclohexylene, phenylene, xylylene, methylenediphenylene or isopropylidenediphenylene, and, when n is 3, $R_2$ is a group of the formula (III) in which p is an integer from 2 to 6.

Those compounds of the formula (I) are particularly preferred in which $R_1$ is $C_1-C_{12}$alkyl, cyclohexyl which is unsubstituted or mono-, di- or tri-substituted by $C_1-C_4$alkyl; $C_3-C_6$alkenyl, phenyl which is unsubstituted or mono-, di- or tri-substituted by $C_1-C_4$alkyl or $C_1-C_4$alkoxy; or benzyl which is unsubstituted or mono-, di- or tri-substituted on the phenyl by $C_1-C_4$alkyl; and n is 1, 2 or 3, and, when n is 1, $R_2$ is as defined for $R_1$ or is a group

where $R_3$ and $R_4$ which are identical or different are as defined for $R_1$, or $R_3$ is also hydrogen or a group

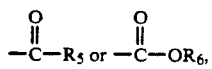

in which $R_5$ is $C_1-C_{12}$alkyl, cyclohexyl which is unsubstituted or mono-, di- or tri-substituted by $C_1-C_4$alkyl; $C_2-C_{10}$alkenyl, phenyl which is unsubstituted or mono-, di- or tri-substituted by $C_1-C_4$alkyl or $C_1-C_4$alkoxy; or benzyl which is unsubstituted or mono-, di- or tri-substituted on the phenyl by $C_1-C_4$alkyl; and $R_6$ is $C_1-C_{12}$alkyl, cyclohexyl which is unsubstituted or mono-, di- or tri-substituted by $C_1-C_4$alkyl; $C_3-C_6$alkenyl or benzyl which is unsubstituted or mono-, di- or tri-substituted on the phenyl by $C_1-C_4$alkyl; and, when n is 2, $R_2$ is $C_2-C_8$alkylene, $C_6-C_{10}$alkylene interrupted by 1 or 2 oxygen atoms; cyclohexylene, cyclohexylenedimethylene, methylenedicyclohexylene, a group

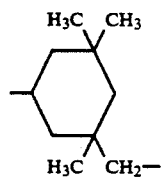

phenylene, methylphenylene, xylylene, methylenediphenylene or oxydiphenylene, or $R_2$ is a group of the formula (IIa) or (IIb) in which $R_8$ is as defined for $R_1$, $R_9$ is a direct bond, $C_1-C_8$alkylene, $C_2-C_{13}$alkylidene, $C_2-C_{14}$alkenylene, cyclohexylene, cyclohexenylene or phenylene, and $R_{10}$ is $C_2-C_8$alkylene, $C_4-C_8$alkylene interrupted by 1, 2 or 3 oxygen atoms, cyclohexylene, cyclohexylenedimethylene, isopropylidenedicyclohexylene, phenylene, xylylene or isopropylidenediphenylene, and, when n is 3, $R_2$ is a group of the formula (III) in which p is 6.

Those compounds of the formula (I) are of special interest in which $R_1$ is $C_1-C_8$alkyl, cyclohexyl, t-butylcyclohexyl, allyl, phenyl or benzyl and n is 1 or 2 and, when n is 1, $R_2$ is as defined for $R_1$ or is a group

where $R_3$ is hydrogen and $R_4$ is as defined above for $R_1$, and, when n is 2, $R_2$ is $C_2-C_6$alkylene, a group —(CH$_2$)$_3$—O—(CH$_2$)$_{2-4}$—O—(CH$_2$)$_3$—, cyclohexylene, cyclohexylenedimethylene, methylenedicyclohexylene, a group

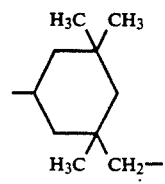

phenylene, methylphenylene, xylylene, methylenediphenylene or oxydiphenylene.

Those compounds of the formula (I) are of particular interest in which $R_1$ is $C_1-C_4$alkyl or phenyl and n is 1 or 2 and, when n is 1, $R_2$ is $C_1-C_4$alkyl, phenyl or cyclohexyl, and, when n is 2, $R_2$ is $C_2-C_6$alkylene, methylenedicyclohexylene, a group

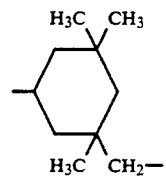

methylphenylene or methylenediphenylene.

The compounds of the formula (I) can be prepared by various known processes as reported, for example, in the laid open prints DE 1,200,824, DE 1,200,825 and WO 87/07,892, starting from products which are commercially available or can easily be prepared by known processes.

The preferred process for the preparation of the compounds of the formula (I) is indicated by the following scheme:

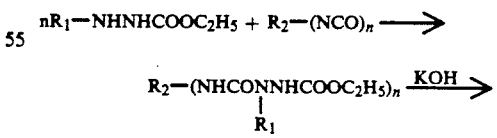

products of formula (I)

As mentioned at the outset, the compounds of the formula (I) are highly effective in stabilising polymeric thermoplastic materials against thermal degradation.

Examples of polymeric materials which can be stabilised are:

1. Polymers of monoolefins and diolefins, for example polypropylene, polyisobutylene, polybutene-1, polymethylpentene-1, polyisoprene or polybutadiene, as well as polymers of cycloolefins, for instance of cyclopentene or norbornene, polyethylene (which optionally can be crosslinked), for example high-density polyethylene (HDPE), low-density polyethylene (LDPE) and linear low-density polyethylene (LLDPE).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, such as, for example, ethylene/propylene, linear low-density polyethylene (LLDPE) and its mixtures with low-density polyethylene (LDPE), propylene/butene-1, ethylene/hexene, ethylene/ethylpentene, ethylene/heptene, ethylene/octene, propylene/isobutylene, ethylene/butene-1, propylene/butadiene, isobutylene/isoprene, ethylene/alkyl acrylates, ethylene/alkyl methacrylates, ethylene/vinyl acetate or ethylene/acrylic acid copolymers and their salts (ionomers) and terpolymers of ethylene with propylene and a diene, such as hexadiene, dicyclopentadiene or ethylidenenorbornene; as well as mixtures of such copolymers and their mixtures with polymers mentioned in 1) above, for example polypropylene/ethylene-propylene copolymers, LDPE/EVA, LDPE/EAA, LLDPE/EVA and LLDPE/EAA.

3a. Copolymers of α-olefins with carbon monoxide, with regular or random alternation.

3b. Hydrocarbon resins (for example $C_5$–$C_9$) and hydrogenated modifications thereof (for example tackifiers).

4. Polystyrene, poly(p-methylstyrene), poly(α-methylstyrene).

5. Copolymers of styrene or α-methylstyrene with dienes or acrylic derivatives, such as, for example, styrene/acrylonitrile, styrene/alkyl methacrylate, styrene/maleic anhydride, styrene/butadiene/ethyl acrylate, styrene/acrylonitrile/methyl acrylate; mixtures of high impact strength from copolymers of styrene and other polymers, such as, for example, from a polyacrylate, a diene polymer or an ethylene/propylene/diene terpolymer and block copolymers of styrene, such as, for example, styrene/butadiene/styrene, styrene/isoprene/styrene, styrene/ethylene/butylene/styrene or styrene/ethylene/propylene/styrene.

6. Graft copolymers of styrene or α-methylstyrene such as, for example, styrene on polybutadiene; styrene on polybutadiene-styrene or polybutadiene-acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene; styrene and alkyl acrylates or methacrylates on polybutadiene; styrene and acrylonitrile on ethylene/propylene/diene terpolymers; styrene and acrylonitrile on polyacrylates or polymethacrylates; styrene and acrylonitrile on acrylate/butadiene copolymers, as well as mixtures thereof with the copolymers listed under 5), for instance the mixtures known as ABS, MBS, ASA and AES polymers.

7. Halogen-containing polymers, such as polychloroprene, chlorinated rubbers, chlorinated or sulfochlorinated polyethylene, epichlorohydrin homo- and copolymers, polymers from halogen-containing vinyl compounds, such as for example polyvinyl chloride, polyvinylidene chloride, polyvinyl fluoride, polyvinylidene fluoride, as well as copolymers thereof, for example vinyl chloride/vinylidene chloride, vinyl chloride/vinyl acetate or vinylidene chloride/vinyl acetate copolymers.

8. Polymers which are derived from α,β-unsaturated acids and derivatives thereof, such as polyacrylates and polymethacrylates, polyacrylamide and polyacrylonitrile.

9. Copolymers from the monomers mentioned under 8) with each other or with other unsaturated monomers, such as, for instance, acrylonitrile/butadiene, acrylonitrile/alkyl acrylate, acrylonitrile/alkoxyalkyl acrylate or acrylonitrile/vinyl halide copolymers or acrylonitrile/alkyl methacrylate/butadiene terpolymers.

10. Polymers which are derived from unsaturated alcohols and amines, or acyl derivatives thereof or acetals thereof, such as polyvinyl alcohol, polyvinyl acetate, polyvinyl stearate, polyvinyl benzoate, polyvinyl maleate, polyvinyl butyral, polyallyl phthalate or polyallylmelamine; as well as their copolymers with olefins mentioned in 1) above.

11. Homopolymers and copolymers of cyclic ethers, such as polyalkylene glycols, polyethylene oxide, polypropylene oxide or copolymers thereof with bis-glycidyl ethers.

12. Polyacetals, such as polyoxymethylene and polyoxymethylenes which contain ethylene oxide as a comonomer; polyacetals modified with thermoplastic polyurethanes, acrylates or MBS.

13. Polyphenylene oxides and sulfides, and mixtures of polyphenylene oxides with polystyrene and polyamides.

14. Polyurethanes which are derived from polyethers, polyesters or polybutadiene with terminal hydroxyl groups on the one hand and aliphatic or aromatic polyisocyanates on the other hand, as well as precursors thereof (polyisocyanates, polyols or prepolymers).

15. Polyamides and copolyamides which are derived from diamines and dicarboxylic acids and/or from aminocarboxylic acids or the corresponding lactams, such as polyamide 4, polyamide 6/6, polyamide 6/10, 6/9, 6/12 and 4/6, polyamide 11, polyamide 12, aromatic polyamides obtained by condensation of m-xylenediamine and adipic acid; polyamides prepared from hexamethylenediamine and isophthalic and/or terephthalic acid and optionally an elastomer as modifier, for example poly-2,4,4-trimethyl-hexamethyleneterephthalamide or poly-m-phenylene-isophthalamide. Further, copolymers of the aforementioned polyamides with polyolefins, olefin copolymers, ionomers or chemically bonded or grafted elastomers; or with polyethers, as, for instance, with polyethylene glycols, polypropylene glycols or polytetramethylene glycols. Polyamides or copolyamides modified with EPDM or ABS. Polyamides condensed during processing (RIM-polyamide systems).

16. Polyureas, polyimides and polyamide-imides.

17. Polyesters which are derived from dicarboxylic acids and diols and/or from hydroxycarboxylic acids or the corresponding lactones, such as polyethylene terephthalate, polybutylene terephthalate, poly-1,4-dimethylolcyclohexane terephthalate, poly-[2,2-(4-hydroxyphenyl)-propane] terephthalate and polyhydroxybenzoate as well as block copolyether-esters derived from polyethers having hydroxyl end groups.

18. Polycarbonates and polyester-carbonates.

19. Polysulfones, polyether-sulfones and polyetherketones.

20. Natural polymers, such as cellulose, rubber and derivatives thereof which are chemically modified in a polymer-homologous manner, such as cellulose acetates, cellulose propionates and cellulose butyrates, or cellulose ethers, such as methylcellulose.

21. Mixtures of the polymers mentioned above, for example PP/EPDM, polyamide 6/EPDM or ABS, PVC/EVA, PVC/ABS, PVC/MBS, PC/ASA, PC/PBT, PVC/CPE, PVC/acrylates, POM/thermoplastic PUR, PC/thermoplastic PUR, POM/acrylate, POM/MBS, PPE/HIPS, PPE/PA 6/6 and copolymers, PA/HDPE, PA/PP, PA/PPE.

The compounds of the formula (I) are particularly suitable for improving the resistance of polyolefins, in particular polyethylene and polypropylene, to thermal degradation.

The compounds of the formula (I) can be used in mixtures with polymeric thermoplastic materials in various proportions depending on the nature of the material to be stabilised, on the end use and on the presence of other additives.

In general, it is appropriate to use, for example, 0.001 to 5% or 0.001 to 1% by weight of the compounds of the formula (I), relative to the weight of the material to be stabilised, preferably between 0.01 and 0.5%.

In general, the compounds of the formula (I) are incorporated in the polymeric thermoplastic materials after the polymerisation or crosslinking of the said materials.

The compounds of the formula (I) can be incorporated in the polymeric thermoplastic materials by various processes, such as dry mixing in the form of powder, or wet mixing in the form of solutions or suspensions or also in the form of a masterbatch; in such operations, the polymer can be used in the form of powder, granules, solutions, suspensions or in the form of latices.

The materials stabilised with the products of the formula (I) can be used for the production of mouldings, films, tapes, monofilaments, fibres and the like.

If desired, other conventional additives for these materials, such as antioxidants, UV absorbers, nickel stabilisers, pigments, fillers, plasticisers, antistatic agents, flameproofing agents, lubricants, corrosion inhibitors and metal deactivators, can be added to the mixtures of the compounds of the formula (I) with the polymeric thermoplastic materials.

Particular examples of additives which can be used in admixture with the compounds of the formula (I) are:

1. Antioxidants 1.1 Alkylated monophenols, for example 2,6di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol.

1.2. Alkylated hydroquinones, for example 2,6-di-tert-butyl-4-methoxyphenol, 2,5-di-tert-butylhydroquinone, 2,5-di-tert-amylhydroquine, 2,6-diphenyl-4-octadecyloxyphenol.

1.3. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol).

1.4. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(6-tert-butyl-4-isobutylphenol), 2,2'-ethylidenebis(4,6-di-tert-butylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)-dicyclopentadiene, bis[2-(3'-tert-butyl-2'-hydroxy-5'-methylbenzyl)-6-tert-butyl-4-methylphenyl] terephthalate.

1.5. Benzyl compounds, for example 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl) dithiolterephthalate, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5-di-tert-butyl-4-hydroxybenzylphosphonate, 1,3,5-tris(3,5-dicyclohexyl-4-hydroxybenzyl) isocyanurate.

1.6. Acylaminophenols, for example lauric acid 4-hydroxyanilide, stearic acid 4-hydroxyanilide, 2,4-bis-(octylmercapto)-6-(3,5-di-tert-butyl-4-hydroxyanilino)-s-triazine, octyl N-(3,5-di-tert-butyl-4-hydroxyphenyl)-carbamate.

1.7. Esters of β-(3,5-di-tert-butyl-4-hydroxyphenyl)-propionic acid with mono- or polyhdric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxamide.

1.8. Esters of β-(5-tert-butyl-4-hydroxy-3-methylphenyl)propionic acid with mono- or polyhdric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'bis(hydroxyethyl)oxamide.

1.9. Esters of β-(3,5-dicyclohexyl-4-hydroxyphenyl)-propionic acid with mono- or polyhdric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxamide.

1.10. Amides of β-(3,5-di-tert-butyl-4-hydroxyphenyl)propionic acid e.g. N,N'-bis(3,5-di-tert-butyl-4-hydroxyphenlpropionyl)hexamethylenediamine, N,N'-bis(3,5-di-tert-butyl-4-hydroxyphenylpropinyl)trimethylenediamine, N,N'-bis(3,5-di-tert-butyl-4-hydroxyphenylpropionyl)hydrazine.

2. UV Absorbers and Light Stabilisers 2.1. 2-(2'-Hydroxyphenyl)benzotriazoles, for example the 5'-methyl, 3',5'-di-tert-butyl, 5'-tert-butyl, 5'-(1,1,3,3-tetramethylbutyl), 5-chloro-3',5'-di-tert-butyl, 5-chloro-3'-tert-butyl-5'-methyl, 3'-sec-butyl-5'-tertbutyl, 4'-octoxy, 3',5'-di-tert-amyl and 3',5'-bis(α,α-dimethylbenzyl) derivatives.

2.2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

2.3. Esters of variously substituted benzoic acids, for example 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate and hexadecyl 3,5-di-tert-butyl-4-hydroxybenzoate.

2.4. Acrylates, for example ethyl α-cyano-β, β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of 4-hydroxy-3,5-di-tert-butylbenzylphosphonic acid monoalkyl esters, e.g. of the methyl or ethyl ester, nickel complexes of ketoximes, e.g. of 2-hydroxy-4-methylphenyl undecyl ketoxime, nickel complexes of 1-phenyl-4-lauroyl-5-hydroxypyrazole, with or without additional ligands.

2.6. Oxalic acid diamides, for example, 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxamide, 2-ethoxy-5-tert-butyl-2'-ethyloxanilide and its mixtures with 2-ethoxy-2'-ethyl-5,4'-di-tert-butyloxanilide and mixtures of ortho- and para-methoxy-disubstituted oxanilides and mixtures of o- and p-ethoxy-disubstituted oxanilides.

2.7 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine.

3. Metal deactivators, for example N,N'-diphenyloxamide, N-salicylal-N'-salicyloylhydrazine, N,N'-bis(-salicyloyl)hydrazine, N,N'-bis(3,5-di-tert-butyl-4-hydroxyphenylpropionyl)hydrazine, 3-salicyloylamino-1,2,4-triazole, bis(benzylidene)oxalodihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, tristearyl sorbitol triphosphite, tetrakis(2,4-di-tert-butylphenyl) 4,4'-biphenylenediphosphonite, 3,9-bis(2,4-di-tert-butylphenoxy)-2,4,8,10-tetraoxa-3,9-diphosphaspiro[5.5]undecane.

4a. Hydroxylamines, for example dibenzylhydroxylamine, dioctylhydroxylamine, didodecylhydroxylamine, ditetradecylhydroxylamine, dihexadecylhydroxylamine, dioctadecylhydroxylamine, 1-hydroxy-2,2,6,6-tetramethyl-4-piperidyl benzoate or bis(1-hydroxy-2,2,6,6-tetramethyl-4-piperidyl) sebacate.

5. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

6. Polyamide stabilisers, for example copper salts in combination with iodides and/or phosphorus compounds and salts of divalent manganese.

7. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium stearate, sodium ricinoleate and potassium palmitate, antimony pyrocatecholate or zinc pyrocatecholate.

8. Nucleating agents, for example 4-tert-butyl-benzoic acid, adipic acid, diphenylacetic acid.

9. Fillers and reinforcing agents, for example calcium carbonate, silicates, glass fibres, asbestos, talc, kaolin, mica, barium sulfate, metal oxides and hydroxides, carbon black, graphite.

10. Other additives, for example plasticisers, lubricants, emulsifiers, pigments, optical brighteners, flameproofing agents, antistatic agents and blowing agents.

Several examples of the preparation of the compounds of the formula (I) and of their use as stabilisers are reported for more detailed illustration of the present invention. These examples are given solely for illustrative purposes and do not imply any restriction.

The compounds disclosed in Examples 1 to 4 are especially preferred compounds of the formula (I).

EXAMPLE 1

32 g (0.2 mol) of ethyl 2-t-butylhydrazinecarboxylate, 16.8 g (0.1 mol) of 1,6-diisocyanatohexane and 200 ml of toluene are heated under reflux for 4 hours.

After cooling to ambient temperature, the precipitate formed is separated off by filtration, washed with toluene and dissolved in 200 ml of an aqueous solution containing 22.4 g of potassium hydroxide.

The solution obtained is heated at 80° C. for 4 hours, cooled to ambient temperature and acidified with concentrated hydrochloric acid.

The precipitate formed is separated off by filtration, washed with water until neutral and recrystallised from ethanol. This gives a product of the formula

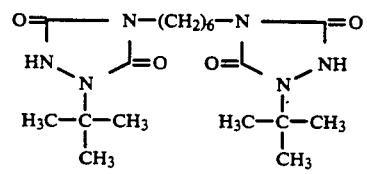

having a melting point of 189°–192° C.

Analysis for $C_{18}H_{32}N_6O_4$: Calculated: C=54.53%; H=8.13%; N=21.20%. Found: C=54.46%; H=8.06%; N=21.21%.

EXAMPLE 2

Following the procedure of Example 1, but using isocyanatobenzene in place of 1,6-diisocyanatohexane, a product of the formula

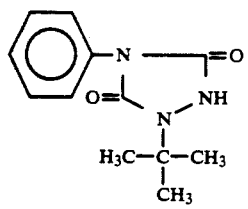

having a melting point of 154°-156° C. (from ethyl acetate) is obtained.

Analysis for $C_{12}H_{15}N_3O_2$: Calculated: C=61.79%; H=6.48%; N=18.01%. Found: C=61.78%; H=6.48%; N=18.02%.

EXAMPLE 3

28.3 g (0.24 mol) of ethyl 2-methylhydrazinecarboxylate, 20.2 g (0.12 mol) of 1,6-diisocyanatohexane and 200 ml of toluene are heated at 110° C. for 3 hours. After cooling to ambient temperature, the precipitate formed is separated off by filtration, washed with toluene and dissolved in 200 ml of an aqueous solution containing 26.9 g of potassium hydroxide.

The solution obtained is heated at 80° C. for 4 hours, cooled to ambient temperature, acidified with concentrated hydrochloric acid and extracted with methyl isobutyl ketone.

The organic solution is evaporated under reduced pressure and the residue is crystallised from ethanol.

This gives a product of the formula

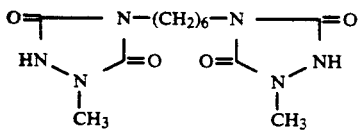

having a melting point of 147°-148° C.

Analysis for $C_{12}H_{20}N_6O_4$: Calculated: C=46.15%; H=6.45%; N=26.91%. Found: C=46.08%; H=6.45%; N=26.73%.

EXAMPLE 4

30.6 g (0.17 mol) of ethyl 2-phenylhydrazinecarboxylate, 14.3 g (0.085 mol) of 1,6-diisocyanatohexane and 200 ml of toluene are heated under reflux for 4 hours. By cooling to ambient temperature, a precipitate is obtained which is separated off by filtration, washed with toluene and dissolved in 200 ml of an aqueous solution containing 19 g of potassium hydroxide.

The solution obtained is heated at 80° C. for 4 hours and, after cooling to ambient temperature, acidified with concentrated hydrochloric acid.

The precipitate formed is separated off by filtration, washed with water until neutral and recrystallised from dimethylformamide.

This gives a product of the formula

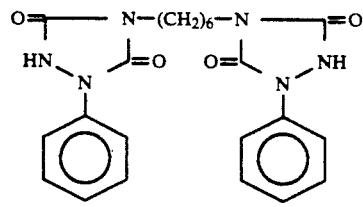

having a melting point of 280°-282° C.

Analysis for $C_{22}H_{24}N_6O_4$: Calculated: C=60.54%; H=5.54%; N=19.25%. Found: C=59.75%; H=5.47%; N=19.13%.

EXAMPLE 5

Process Stabilisation of Polyproplylene at 280° C.

1 g of each of the compounds indicated in Table 1, 0.5 g of pentaerythritol tetrakis[3-(3,5-di-t-butyl-4-hydroxyphenyl)-propionate] (antioxidant) and 1 g of calcium stearate are mixed in a slow mixer with 1000 g of polypropylene powder of melt index=2.1/10 minutes (measured at 230° C./2.16 kg).

The mixtures obtained are extruded using an extruder having the following characteristics:

Internal diameter: 25 mm
L/D ratio: 25
rpm: 64
Head temperature: 280° C.

to obtain polymer granules which are extruded twice more. The melt flow index at 230° C./2.16 kg is measured on the granules obtained after the first and third extrusions.

The values obtained are reported in Table 1.

TABLE 1

| Stabiliser | Melt index after | |
|---|---|---|
| | 1 extrusion | 3 extrusions |
| Without compounds of the formula (I) | 4.3 | 12.1 |
| Compound from Example 1 | 2.6 | 3.9 |
| Compound from Example 2 | 3.1 | 5.1 |
| Compound from Example 3 | 3.0 | 4.8 |
| Compound from Example 4 | 3.6 | 5.2 |

A small difference between the melt index values after the first and third extrusions indicates a good stabilisation of the polymer.

What is claimed is:

1. A composition stabilised against thermal degradation, comprising a polymeric thermoplastic material and an effective stabilising amount of a compound of the formula (I)

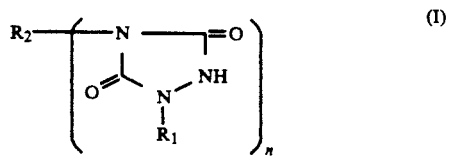

in which $R_1$ is $C_1$-$C_{18}$alkyl, $C_5$-$C_{12}$cycloalkyl which is unsubstituted or mono-, di- or tri-substituted by $C_1$-$C_4$alkyl; $C_3$-$C_{18}$alkenyl, phenyl which is unsubstituted or mono-, di-or tri-substituted by radicals selected from the group consisting of $C_1$-$C_4$alkyl, $C_1$-$C_4$alkoxy and OH; $C_7$-$C_9$phenylalkyl which is unsubstituted or mono- , di- or tri-substituted on the phenyl by radicals selected from the group consisting of $C_1$–$C_4$alkyl and OH; n is 1, 2 or 3 and, when n is 1, $R_2$ is as defined for $R_1$ or is a group

where $R_3$ and $R_4$ which are identical or different are as defined for $R_1$, or $R_3$ is also hydrogen or a group

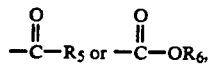

in which $R_5$ is hydrogen, $C_1$–$C_{18}$alkyl, $C_5$–$C_{12}$cycloalkyl which is unsubstituted or mono-, di-or tri-substituted by $C_1$–$C_4$alkyl; $C_2$–$C_{18}$alkenyl, phenyl which is unsubstituted or mono-, di- or tri-substituted by radicals selected from the group consisting of $C_1$–$C_4$alkyl, $C_1$–$C_4$alkoxy and OH; $C_7$–$C_9$phenylalkyl which is unsubstituted or mono-, di- or tri-substituted on the phenyl by radicals selected from the group consisting of $C_1$–$C_4$alkyl and OH; and $R_6$ is $C_1$–$C_{18}$alkyl, $C_5$–$C_{12}$cycloalkyl which is unsubstituted or mono-, di- or tri-substituted by $C_1$–$C_4$alkyl; $C_3$–$C_{18}$alkenyl or $C_7$–$C_9$phenylalkyl which is unsubstituted or mono-, di-or tri-substituted on the phenyl by $C_1$–$C_4$alkyl; and when n is 2, $R_2$ is $C_2$–$C_{12}$alkylene, 2-hydroxytrimethylene, $C_4$–$C_{12}$alkylene interrupted by 1, 2 or 3 oxygen atoms or by an $>$N—$R_7$ group, with $R_7$ being as defined for $R_6$ or being hydrogen; $C_5$–$C_7$cycloalkylene, $C_5$–$C_7$cycloalkylenedi-($C_1$–$C_4$alkylene), $C_1$–$C_4$alkylenedi-($C_5$–$C_7$cycloalkylene), $C_2$–$C_4$alkylidenedi-($C_5$–$C_7$cycloalkylene), a group

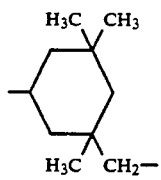

phenylene, phenylenedi-($C_1$–$C_4$alkylene), ($C_1$–$C_4$alkylene)-diphenylene, ($C_2$–$C_4$alkylidene)-diphenylene or oxydiphenylene, each phenylene group and cycloalkylene group is unsubstituted or mono- or di-substituted by $C_1$–$C_4$alkyl; or $R_2$ is a group of the formula (IIa) or (IIb)

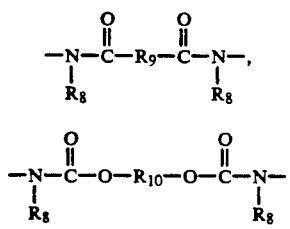

in which $R_8$ is as defined for $R_1$, $R_9$ is a direct bond, $C_1$–$C_{12}$alkylene, $C_2$–$C_{12}$alkylene interrupted by 1, 2 or 3 oxygen atoms or by an $>$N—$R_7$ group, with $R_7$ being as defined above; $C_2$–$C_{20}$alkylidene, phenyl-($C_1$–$C_{14}$alkylidene), phenylene which is unsubstituted or mono- or di-substituted by $C_1$–$C_4$alkyl; $C_2$–$C_{20}$alkenylene, $C_5$–$C_7$cycloalkylene, $C_5$–$C_7$cycloalkenylene, $C_7$–$C_9$bicycloalkylene or $C_7$–$C_9$bicycloalkenylene, each cycloalkylene group, cycloalkenylene group, bicycloalkylene group and bicycloalkenylene group is unsubstituted or mono- or di-substituted by $C_1$–$C_4$alkyl; $R_{10}$ is $C_2$–$C_{12}$alkylene, $C_4$–$C_{12}$alkylene interrupted by 1, 2 or 3 oxygen atoms; $C_5$–$C_7$cycloalkylene, $C_5$–$C_7$cycloalkylenedi-($C_1$–$C_4$alkylene), $C_1$–$C_4$alkylenedi-($C_5$–$C_7$cycloalkylene), $C_2$–$C_4$alkylidenedi-($C_5$–$C_7$cycloalkylene), phenylene, phenylenedi-($C_1$–$C_4$alkylene), ($C_1$–$C_4$alkylene)-diphenylene or ($C_2$–$C_4$alkylidene)-diphenylene, each phenylene group and cycloalkylene group is unsubstituted or mono- or di-substituted by $C_1$–$C_4$alkyl; and, when n is 3, $R_2$ is a group of the formula (III)

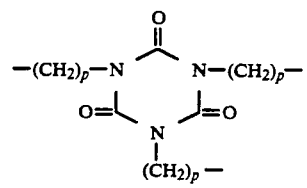

in which p is an integer from 2 to 6.

2. A composition according to claim 1, stabilised with one or more compounds of the formula (I) in which $R_1$ is $C_1$–$C_{16}$alkyl, $C_5$–$C_8$cycloalkyl which is unsubstituted or mono-, di- or tri-substituted by $C_1$–$C_4$alkyl; $C_3$–$C_{12}$alkenyl, phenyl which is unsubstituted or mono-, di- or tri-substituted by radicals selected from the group consisting of $C_1$–$C_4$alkyl, $C_1$–$C_4$alkoxy and OH; benzyl or phenylethyl which, both, are unsubstituted or mono-, di- or tri-substituted on the phenyl by radicals selected from the group consisting of $C_1$–$C_4$alkyl and OH; n is 1, 2 or 3 and, when n is 1, $R_2$ is as defined for $R_1$ or is a group

where $R_3$ and $R_4$ which are identical or different are as defined for $R_1$, or $R_3$ is also hydrogen or a group

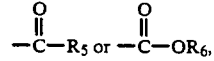

in which $R_5$ is hydrogen, $C_1$–$C_{16}$alkyl, $C_5$–$C_8$cycloalkyl which is unsubstituted or mono-, di-or tri-substituted by $C_1$–$C_4$alkyl; $C_2$–$C_{17}$alkenyl, phenyl which is unsubstituted or mono-, di- or tri-substituted by radicals selected from the group consisting of $C_1$–$C_4$alkyl, $C_1$–$C_4$alkoxy and OH; benzyl or phenylethyl which, both, are unsubstituted or mono-, di- or tri-substituted on the phenyl by radicals selected from the group consisting of $C_1$–$C_4$alkyl and OH; and $R_6$ is $C_1$–$C_{16}$alkyl, $C_5$–$C_8$cycloalkyl which is unsubstituted or mono-, di-or tri-substituted by $C_1$–$C_4$alkyl; $C_3$–$C_{12}$alkenyl or benzyl which is unsubstituted or mono-, di- or trisubstituted on the phenyl by $C_1$–$C_4$alkyl; and, when n is 2, $R_2$ is $C_2$–$C_{10}$alkylene, 2-hydroxytrimethylene, $C_4$–$C_{10}$alkylene interrupted by 1, 2 or 3 oxygen atoms or by an $>$N—$R_7$ group, with $R_7$ being as defined for $R_6$ or being hydrogen; cyclohexylene, cyclohexylenedimethylene, methylenedicyclohexylene, isopropylidenedicyclohexylene, a group

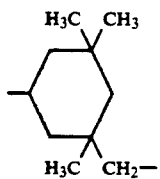

phenylene, methylphenylene, xylylene, methylenediphenylene, isopropylidenediphenylene or oxydiphenylene or $R_2$ is a group of the formula (IIa) or (IIb) in which $R_8$ is defined as for $R_1$, $R_9$ is a direct bond, $C_1$-$C_{10}$alkylene, $C_2$-$C_{10}$alkylene interrupted by 1, 2 or 3 oxygen atoms or by an $>N$—$R_7$ group with $R_7$ being as defined above; $C_2$-$C_{15}$alkylidene, phenyl-($C_1$-$C_{10}$alkylidene), $C_2$-$C_{16}$alkenylene, cyclohexylene, methylcyclohexylene, cyclohexenylene, bicycloheptylene, bicycloheptenylene or phenylene, and $R_{10}$ is $C_2$-$C_{10}$alkylene, $C_4$-$C_{10}$alkylene interrupted by 1, 2 or 3 oxygen atoms; cyclohexylene, cyclohexylenedimethylene, methylenedicyclohexylene, isopropylidenedicyclohexylene, phenylene, xylylene, methylenediphenylene or isopropylidenediphenylene, and, when n is 3, $R_2$ is a group of the formula (III) in which p is an integer from 2 to 6.

3. A composition according to claim 1, stabilised with one or more compounds of the formula (I) in which $R_1$ is $C_1$-$C_{12}$alkyl, cyclohexyl which is unsubstituted or mono-, di- or tri-substituted by $C_1$-$C_4$alkyl; $C_3$-$C_6$alkenyl, phenyl which is unsubstituted or mono-, di-or tri-substituted by $C_1$-$C_4$alkyl or $C_1$-$C_4$alkoxy; or benzyl which is unsubstituted or mono-, di- or tri-substituted on the phenyl by $C_1$-$C_4$alkyl; and n is 1, 2 or 3, and, when n is 1, $R_2$ is as defined for $R_1$ or is a group

where $R_3$ and $R_4$ which are identical or different are as defined for $R_1$, or $R_3$ is also hydrogen or a group

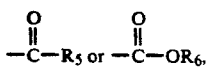

in which $R_5$ is $C_1$-$C_{12}$alkyl, cyclohexyl which is unsubstituted or mono-, di- or tri-substituted by $C_1$-$C_4$alkyl; $C_2$-$C_{10}$alkenyl, phenyl which is unsubstituted or mono-, di- or tri-substituted by $C_1$-$C_4$alkyl or $C_1$-$C_4$alkoxy; or benzyl which is unsubstituted or mono-, di- or tri-substituted on the phenyl by $C_1$-$C_4$alkyl; and $R_6$ is $C_1$-$C_{12}$alkyl, cyclohexyl which is unsubstituted or mono-, di- or tri-substituted by $C_1$-$C_4$alkyl; $C_3$-$C_6$alkenyl or benzyl which is unsubstituted or mono-, di- or tri-substituted on the phenyl by $C_1$-$C_4$alkyl; and, when n is 2, $R_2$ is $C_2$-$C_8$alkylene, $C_6$-$C_{10}$alkylene interrupted by 1 or 2 oxygen atoms; cyclohexylene, cyclohexylenedimethylene, methylenedicyclohexylene, a group

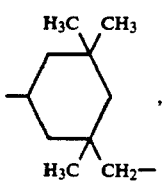

phenylene, methylphenylene, xylylene, methylenediphenylene or oxydiphenylene, or $R_2$ is a group of the formula (IIa) or (IIb) in which $R_8$ is as defined for $R_1$, $R_9$ is a direct bond, $C_1$-$C_8$alkylene, $C_2$-$C_{13}$alkylidene, $C_2$-$C_{14}$alkenylene, cyclohexylene, cyclohexenylene or phenylene, and $R_{10}$ is $C_2$-$C_8$alkylene, $C_4$-$C_8$alkylene interrupted by 1, 2 or 3 oxygen atoms, cyclohexylene, cyclohexylenedimethylene, isopropylidenedicyclohexylene, phenylene, xylylene or isopropylidenediphenylene, and, when n is 3, $R_2$ is a group of the formula (III) in which p is 6.

4. A composition according to claim 1, stabilised with one or more compounds of the formula (I) in which $R_1$ is $C_1$-$C_8$alkyl, cyclohexyl, t-butylcyclohexyl, allyl, phenyl or benzyl and n is 1 or 2 and, when n is 1, $R_2$ is as defined for $R_1$ or is a group

where $R_3$ is hydrogen and $R_4$ is as defined above for $R_1$, and, when n is 2, $R_2$ is $C_2$-$C_6$alkylene, a group —(CH$_2$)$_3$—O—(CH$_2$)$_2$—$_4$—O—(CH$_2$)$_3$—, cyclohexylene, cyclohexylenedimethylene, methylenedicyclohexylene, a group

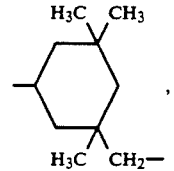

phenylene, methylphenylene, xylylene, methylenediphenylene or oxydiphenylene.

5. A composition according to claim 1, stabilised with one or more compounds of the formula (I) in which $R_1$ is $C_1$-$C_4$alkyl or phenyl and n is 1 or 2 and, when n is 1, $R_2$ is $C_1$-$C_4$alkyl, phenyl or cyclohexyl, and, when n is 2, $R_2$ is $C_2$-$C_6$alkylene, methylenedicyclohexylene, a group

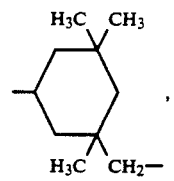

methylphenylene or methylenediphenylene.

6. A composition according to claim 1 comprising in addition to one or more compounds of the formula (I), an additive for thermoplastic polymers selected from the group consisting of antioxidants, UV absorbers, nickel stabilizers, pigments, fillers, plasticizers, antistatic agents, flameproofing agents, lubricants, corrosion inhibitors and metal deactivators.

7. A composition according to claim 1, wherein the polymeric thermoplastic material is a polyolefin.

8. A composition according to claim 1, wherein the polymeric thermoplastic material is polyethylene or polypropylene.

9. A method for stabilising a polymeric thermoplastic material against thermal degradation, which comprises incorporating into said thermoplastic material an effective stabilising amount of a compound of the formula (I) according to claim 1 as a stabiliser.

* * * * *